United States Patent [19]

Murphree

[11] Patent Number: 4,467,645
[45] Date of Patent: Aug. 28, 1984

[54] WEIR

[76] Inventor: A. Pat Murphree, 15215 E. Melrose, Gilbert, Ariz. 85234

[21] Appl. No.: 477,255

[22] Filed: Mar. 21, 1983

[51] Int. Cl.³ .............................................. G01F 1/20
[52] U.S. Cl. ....................................... 73/215; 405/90
[58] Field of Search .................... 73/215, 216; 405/90, 405/91

[56] References Cited

U.S. PATENT DOCUMENTS

| | | | |
|---|---|---|---|
| 1,372,138 | 3/1921 | Herschel | 73/215 |
| 1,855,100 | 4/1932 | Crill | 405/90 |
| 2,415,332 | 2/1947 | Blackmore | 405/90 |
| 2,642,723 | 6/1953 | Reismann | 405/90 |
| 2,763,992 | 9/1956 | Rothenberger | 405/90 |

OTHER PUBLICATIONS

R. C. Dinauer, "Irrigation of Agricultural Lands", Agronomr, No. 11, 1967, pp. 830-833.
J. D. Zimmerman, Irrigation, John Wiley & Sons, Inc., N.Y., 1966, pp. 308-311, 352-355.

Primary Examiner—Charles A. Ruehl
Attorney, Agent, or Firm—Cahill, Sutton & Thomas

[57] ABSTRACT

A portable weir for measuring water flow through an irrigation canal is provided in an obliquely disposed check gate shaped to fit the cross sectional configuration of the canal. The weir opening in the check gate is reinforced by a cooperating network of reinforcing members to assure reliable readings from the weir even though it is subjected to rough handling in the field.

4 Claims, 6 Drawing Figures

U.S. Patent  Aug. 28, 1984  4,467,645
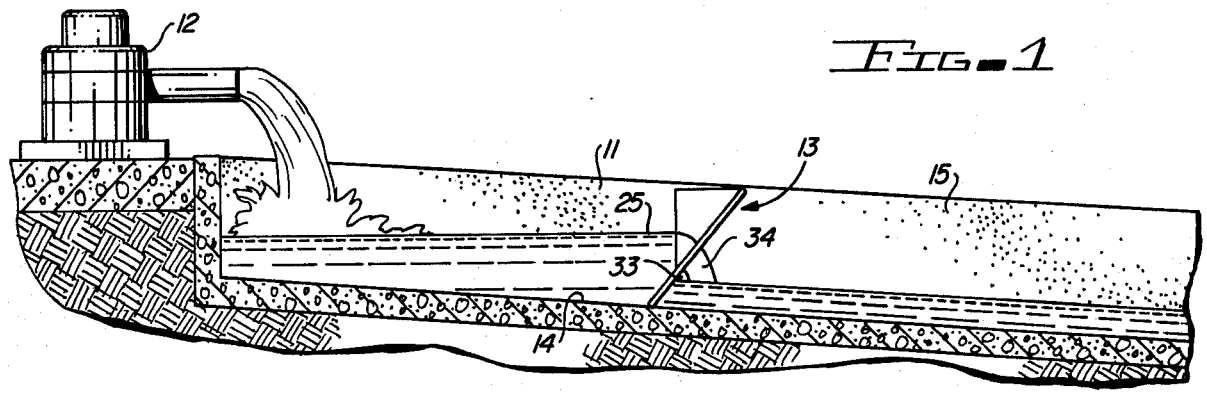
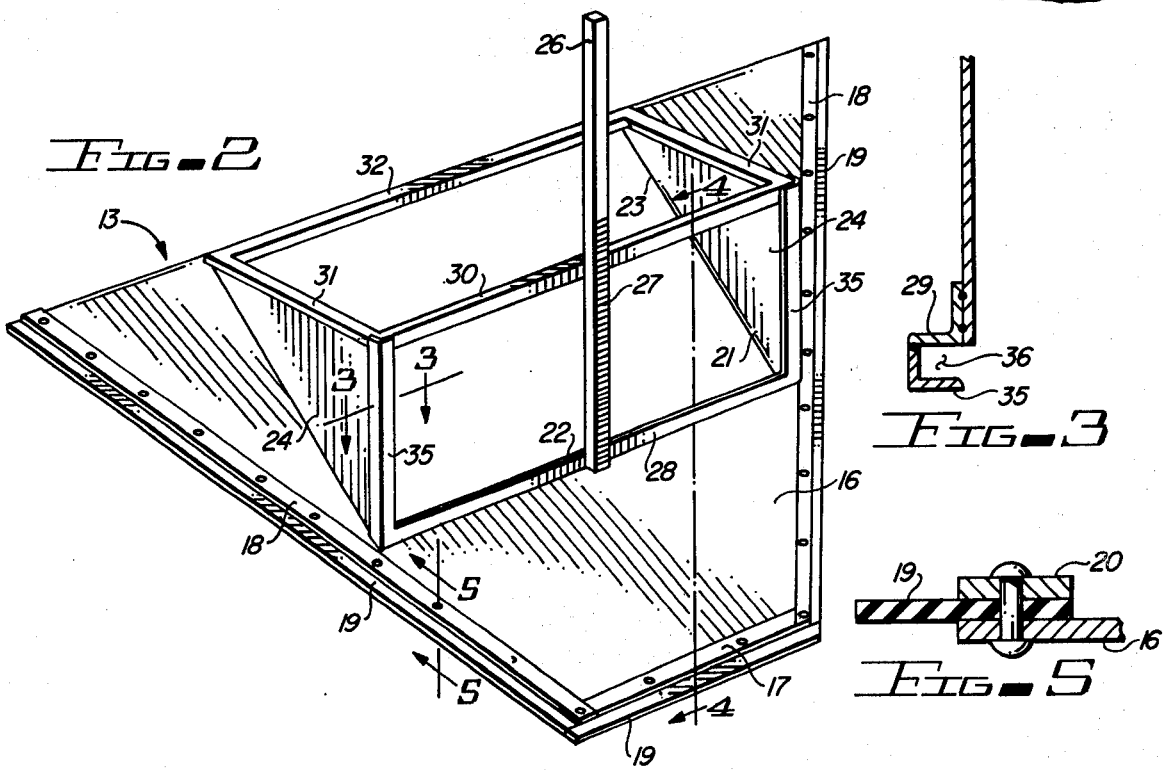
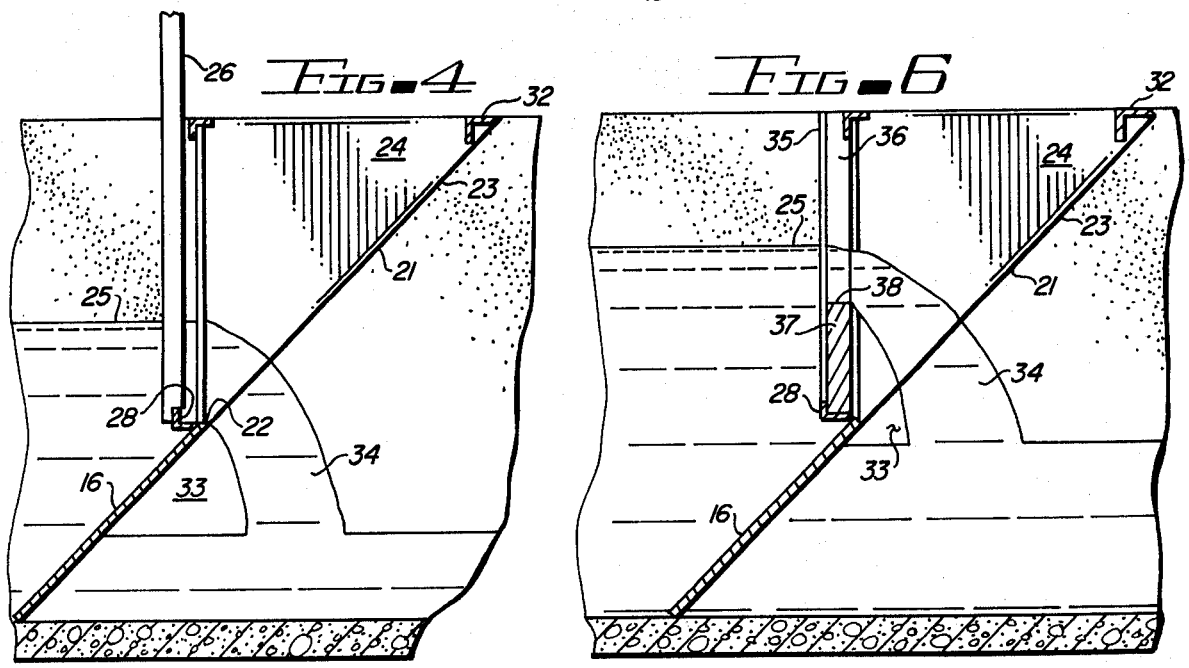

WEIR

TECHNICAL FIELD

This invention is concerned with water flow measurement in the irrigation of agricultural lands.

BACKGROUND ART

Accurate measurement of the quantity of water distributed to each field of irrigated farmland is becoming increasingly important to the farmer. He first must assure himself that an adequate quantity of water is provided for the crops in any given field. And, secondly, he must not waste water by overwatering. Furthermore, having accurate records of the quantity of water delivered to any given field also enables the farmer to determine the efficiency of his land leveling and efficiency of water pumping. The cost of water, particularly where the water must be pumped from wells, is a significant factor in the cost of growing crops and, therefore, one over which strict control must be maintained.

Many farmland irrigation systems in use throughout the world today employ networks of open canals, or ditches, for distributing water to the fields. The most practical way to measure water flowing through a canal section is to employ a weir. See "Irrigation" by Joseph D. Zimmerman, John Wylie & sons, Inc., New York 1966, pages 353 to 355. Although considerable measuring accuracy can be achieved with permanent weirs built into the canal system as suggested in the Zimmerman text, it often is not economically feasible to provide a permanent weir at each location where flow measurement is desired. So a need has arisen for portable weirs which can be moved from site to site.

It has been proposed to build measuring weirs into check gates, or checks, and dams which have long been used to control the flow of water through the different portions of an irrigation network. Portable versions of check gates have often taken the form of flat plates cut to fit the bottom and sidewall surfaces of the canal. These check gates are installed across the canal at an angle to the vertical with the upper face of the plate facing upstream so that the weight of water backed up behind and above the check plate holds the check in place in the canal. See, for example, "Irrigation of Agricultural Lands", Managing Editor R. C. Dinauer, American Society of Agronomy, Madison, Wis., 1967, pages 830 to 833, and the aforementioned Zimmerman text at pages 308 to 311.

As suggested in the Dinauer text, weir-like openings can and have been provided in portable check gates to provide portable weirs. One of the shortcomings of past portable weirs constructed in check gates has been a lack of accuracy and reliability over time. In order to be truly portable, the weight of the weir must be kept to a minimum so that it can be lifted and transported by field workers without the aid of a crane. But light weight has usually meant fragile construction so that past weirs, when subjected to normal rough and tumble handling in the field, have become bent, dented, and distorted in the structure providing the weir opening with the result that accurate measurements could no longer be obtained.

DISCLOSURE OF INVENTION

This invention is an improved portable weir which gives accurate and reliable readings throughout the life of the device even when subjected to rough handling. The improvements reside primarily in the manner in which the weir notch is provided in a check gate adapted to be positioned within the canal. A coordinated system of reinforcing members is provided which has a reinforcing member secured to the gate along the weir crest, other reinforcing members secured along upstanding weir sideplates and a further reinforcing member disposed across the top of the weir notch and connecting and stabilizing the upper regions of the weir side plates. The latter reinforcing member, i.e., the one extending across the top of the weir notch, is also useful as a handle for lifting and transporting the weir. This reinforcing system assures that the accuracy of the weir opening is maintained so that flow readings taken therein are accurate and reliable. In its preferred form, the weir also has a further reinforcing member secured along the top edge of the check gate and across the weir notch to further stabilize the weir opening. This further reinforcing member also serves as an additonal handling member facilitating placement and removal of the weir in and from a canal.

BRIEF DESCRIPTION OF THE DRAWINGS

FIG. 1 is a vertical sectional view through an irrigation canal having the portable weir of this invention installed therein;

FIG. 2 is a perspective view of the portable weir of this invention;

FIG. 3 is a partial sectional view of a portion of the weir taken generally as indicated by the line 3—3 in FIG. 2;

FIG. 4 is a vertical sectional view through the weir taken generally as indicated by line 4—4 in FIG. 2;

FIG. 5 is a partial sectional view of a portion of the weir taken generally as indicated by line 5—5 in FIG. 2; and FIG. 6 is a vertical sectional view through the weir to which a member has been added to raise the crest of the weir.

BEST MODE FOR CARRYING OUT THE INVENTION

Referring particularly to FIG. 1, there is illustrated an irrigation canal, or ditch, indicated generally by reference numeral 11, which is receiving water from a motorized pump 12. For the purpose of measuring the flow of water along canal 11, there is disposed within the canal a weir 13 constructed in accordance with this invention. Canal 11 is of conventional construction, being trapezoidal in cross-section and having a concrete lined bottom 14 and concrete lined sloping sidewalls 15. A typical irrigation canal will have a bottom width of approximately one foot and a sidewall slope at an angle of approximately 45° to an open top having a width of approximately six feet.

The weir 13 constructed in accordance with this invention to be utilized with canal 11 is shown in greater detail in FIG. 2. Weir 13 is constructed in a check gate, or check, 16 shaped to closely conform to the cross sectional dimensions of canal 11. Specifically, check gate 16 has a trapezoidal configuration with a bottom edge 17 adapted to engage the bottom 14 of the canal and sloping side edges 18 that engage sidewalls 15 of the canal. If desired, the bottom 17 and side edges 18 of check gate 16 may be provided with sealing strips 19 made of rubber or other flexible material to compensate for any surface irregularities in the canal 11.

Sealing strips 19 are preferably held in place at the edges of check gate 16 by clamping strips 20 which may be riveted or bolted to check gate 16 with the sealing strips 19 therebetween (see FIG. 5). Clamping strips 20 also serve to strengthen and rigidify edges 17 and 18 of check gate 16.

As should be apparent from FIGS. 1 and 2, check gate 16 is adapted to be positioned across the width of canal 11 but obliquely with respect to the vertical so as to present an upper face thereof upstream with respect to the flow through the canal. With this disposition, water held back by check gate 16 bears down on the upper face of the check gate and presses it into tight engagement with the walls 15 and bottom 14 of the canal and causes the check gate to remain in place in the canal.

Check gate 16 has a weir notch 21 provided therein through which passes a flow of water to be measured. Weir notch 21 provides a weir crest 22 extending horizontally across the check gate 16 and spaced above the bottom edge 17 of the check gate. Weir notch 21 also has side edges 23 extending upwardly from weir crest 22 to the upper edge of check gate 16. Extending upwardly from the weir side edges 23 of weir notch 21 are a pair of weir side plates 24. Weir side plates 24 are triangular in configuration, extend vertically upwardly from weir crest 22 and rearwardly to the top edge of check gate 16.

Weir crest 22 and weir side plates 24 form three dimensions, i.e., the bottom and sides of a weir opening, or notch, the rate of flow of water through which can be measured by measuring the head, or depth, of water over the crest of the weir opening. In other words, with the dimensions of the weir opening known, the volume of flow can be calculated once the vertical dimension, or head, of the flow is determined. Although sophisticated measuring devices can be employed to determine the height of the surface 25 of the water above the weir crest 22, it is customary in farmland irrigation practice to employ a measuring stick 26 having markings 27 directly thereon to measure this dimension. The markings on stick 26 can be in miner's inches, a quantity measurement commonly used in the field of hydraulics, or the markings on the stick can be calibrated to read volume flow directly, such as in cubic feet per second. In practice, to take a measurement, the user allows the weir to remain in place in canal 11 for a period of time, say 15 to 30 minutes, to permit the water ahead of the weir to stablize. Measuring stick 26 is then placed into the position shown in FIGS. 2 and 3 and a reading taken of the head, or position of the surface 25 of the water above the weir crest 22. If desired, measuring stick 26 may have a notch at its lower end to facilitate placement of the bottom of the stick on the weir crest. It is common practice with weirs provided in check gates for use in the field to dampen the measuring stick 26 and coat it with fine dirt before placing the stick in the weir to take a measurement. The dirt remaining on the stick after it is placed in the weir facilitates reading the head of water.

The components of weir 13 described above are preferably constructed of sheet metal, which may be 14 gauge sheet steel, which easily gives the weir sufficient strength to resist the water pressures to which it is subjected. Because light weight enhances portability of weir 13, the weir can, if desired, be manufactured of sheet aluminum or other light weight materials.

Any weir constructed to be sufficiently light as to be readily portable by a worker can be distorted or damaged by rough handling during use. As mentioned previously, this is one of the principal shortcomings of prior weirs constructed as check gate structures. In accordance with this invention, the integrity and accuracy of the weir opening in the check gate 16 is assured, even with rough handling of the structure, by a cooperating network of reinforcing members associated with the weir opening. The weir crest 22 is reinforced by a reinforcing member 28 in the form of an angle brace secured along the length of the weir crest portion 22 of the weir notch in check gate 16. An angle iron forming reinforcing member 28 is preferably welded to the check gate 16 at the weir crest 22. If desired, reinforcing member 28 as well as other reinforcing members incorporated into this structure may be formed of aluminum or other light weight materials.

The reinforcing structure for weir 13 further comprises a pair of weir side plate reinforcing members 29 secured vertically along the upstream edges of weir side plates 24. Reinforcement of the weir opening above weir crest 22 is completed by another reinforcing member 30 secured to and connecting the top edges of the weir side plates 24 directly above weir crest 22. The reinforcing structure consisting of members 28 and 29 and 30 provide a rugged and rigid weir entry capable of maintaining its alignment for achieving accurate measurements. In addition, reinforcing member 30 extending across the width of check gate 16 in the vicinity of the vertical axis of the center of gravity of the check gate 16 provides a convenient handle for lifting and placing the weir 13 into the irrigation canal 11.

Reinforcing member 30 also serves as a rest, or stop, for measuring stick 26, assisting the user in holding the stick in a vertical position while a measurement is being taken.

Further reinforcing of the weir structure is desirable and to this end the reinforcing network may comprise additional weir side plate reinforcement in the form of angle members 31 secured to the top edges of the weir side plates 24. Further, there is provided a reinforcing and stiffening member for the top edge of check gate 16 by another angle member 32 which may also serve a secondary purpose as a handle for lifting and positioning the weir 13.

Weirs of the type contemplated by this invention give accurate flow measurement readings only when the discharge therefrom is free-falling, i.e., there is an air pocket 33 (see FIGS. 1 and 4) beneath the nappe 34, or downstream flow from the weir. In situations where, because of low flow rate or lack of slope in the canal, it is not possible to obtain a free falling weir flow it is desirable to raise the weir crest to achieve free falling flow. Provision is made in the weir of this invention for that eventuality through the addition of angle guides 35 secured to reinforcing members 29 carried at the upstream edge of weir side plates 24. Angle guides 35 are secured to members 29 in such a manner as to provide a vertical channel 36 (see FIG. 3) at weir side edges 23. Channels 36 are adapted to receive a board 37, or other plate-like member, to provide at its upper edge a supplemental, raised weir crest 38 (see FIG. 6). With board 37 in place, the water level 25 upstream of weir 13 is raised with respect to the level of water downstream of the weir so that an air pocket 33 can be achieved beneath the nappe 34. Angle members 35 cooperate with reinforcing members 29 to further reinforce and rigidify the weir opening and serve to transmit the weight of check gate 16 to the handle-like reinforcing member 30 when the weir is lifted and transported.

From the foregoing, it should be apparent that this invention provides a rugged, reliable portable weir capable of giving prolonged, reliable service in the field.

What is claimed is:

1. A portable weir for measuring water flow in an irrigation canal comprising a check gate having side, top and bottom edges and a face, said gate being adapted to be disposed in an irrigation canal with the side and bottom edges thereof in engagement respectively with the sidewalls and bottom of the canal and the face thereof disposed across the canal but obliquely with respect to the vertical, said check gate face facing upwardly and upstream of the canal whereby water flowing through the canal presses downwardly on the face of the gate to keep the weir in position in the canal, a weir notch formed in said check gate to provide a weir crest spaced above the bottom edge of the gate and weir side edges extending upwardly from said crest to the top edge of the gate, weir side plates extending vertically upwardly from the weir side edges on said gate, and said weir side plates having upstream edges extending vertically upwardly from said weir crest, and reinforcing members secured to said weir crest, to the upstream regions of said weir side plates and connecting the uppermost regions of said weir side plates for maintaining dimensional stability of the weir, the reinforcing member connecting the uppermost regions of said weir side plates serving as a handle for lifting and carrying the weir.

2. The weir of claim 1 further comprising a reinforcing member secured to the top edge of said check gate across said weir notch.

3. The weir of claim 2 further comprising reinforcing members secured along the upper region of said weir side plates from the upstream region thereof to said check gate.

4. The weir of claim 1 wherein said reinforcing members secured to the upstream regions of said weir side plates are oppositely disposed channel members for releasably receiving a weir crest raising member.

* * * * *